Oct. 4, 1932.  F. I. EPLEY  1,881,176
ROTARY DRILLING
Filed April 16, 1931  2 Sheets-Sheet 1

INVENTOR
Frederic I. Epley
BY
ATTORNEY

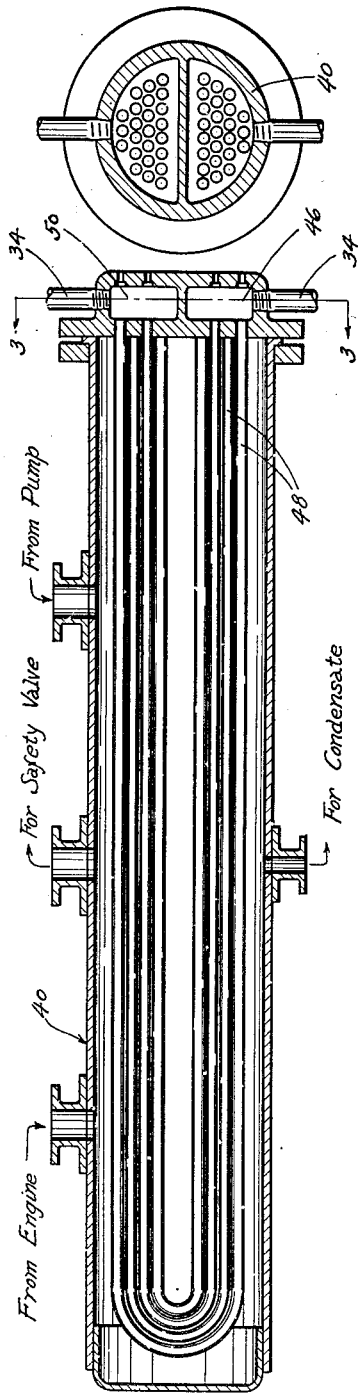
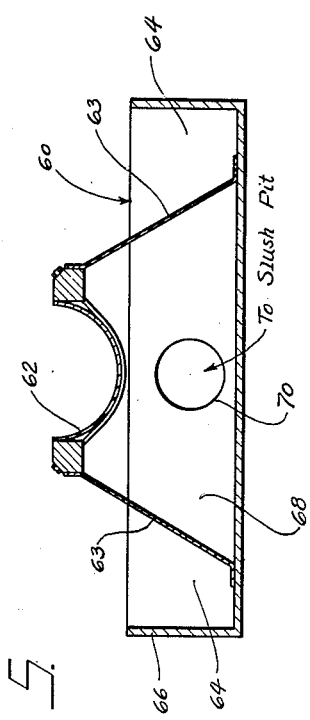

Patented Oct. 4, 1932

1,881,176

UNITED STATES PATENT OFFICE

FREDERIC I. EPLEY, OF NORTH PELHAM, NEW YORK, ASSIGNOR TO THE SUPERHEATER COMPANY, OF NEW YORK, N. Y.

ROTARY DRILLING

Application filed April 16, 1931. Serial No. 530,738.

The present invention relates to the art of drilling wells and aims to provide a method and means for increasing the efficiency of rotary drilling operations. Both reciprocating and rotary apparatus have long been used for drilling, but the rotary system has become increasingly popular both on account of its greater average rate of drilling and the lessened tendency of the hole to cave. In the process of drilling wells with rotary apparatus, it is necessary to force fluid through the drill shaft to wash away the chips and cuttings from the tool. It has long been known that a liquid mud or slush is very efficient for this purpose since its density and viscosity are both relatively very high and enable it to act more efficiently on the cuttings than water of average consistency. It has been found, moreover, that the mud at the hydrostatic heads produced in deep drilling is very effective in penetrating porous gas-bearing strata and sealing off such strata against the flow of gas and/or water and thereby minimizing both the tendency of the gas to cause blow outs and the tendency of such strata to cave into the hole.

It is an object of my invention to provide a method and apparatus whereby the effectiveness of the mud for this purpose is increased.

A great many of the rotary well drilling apparatuses are of the steam-driven type and it is often a problem in the field to obtain sufficient boiler feed water of suitable character. It is a further object of my invention to provide an apparatus adapted to carry out my above mentioned method and at the same time to substantially eliminate the problem of boiler feed water for drilling rigs.

The novel features of my invention are pointed out with particularity in the appended claims. In order, however, that my invention may be clearly understood, I will now describe in detail, in connection with the accompanying drawings, a particular drilling installation forming a specific embodiment of my invention and adapted to operate in accordance with the method of my invention. In such drawings, Fig. 1 is an elevational view of a rotary steam operated drilling rig, somewhat diagrammatic in character, parts being broken away and parts being shown in section for purposes of illustration.

Fig. 3 is a transverse section on line 3—3 of Fig. 4.

Fig. 4 is a central longitudinal section of the condenser shown in Fig. 1.

Fig. 5 is a sectional elevation of a separator indicated diagrammatically in Figs. 1 and 2.

Figure 1:
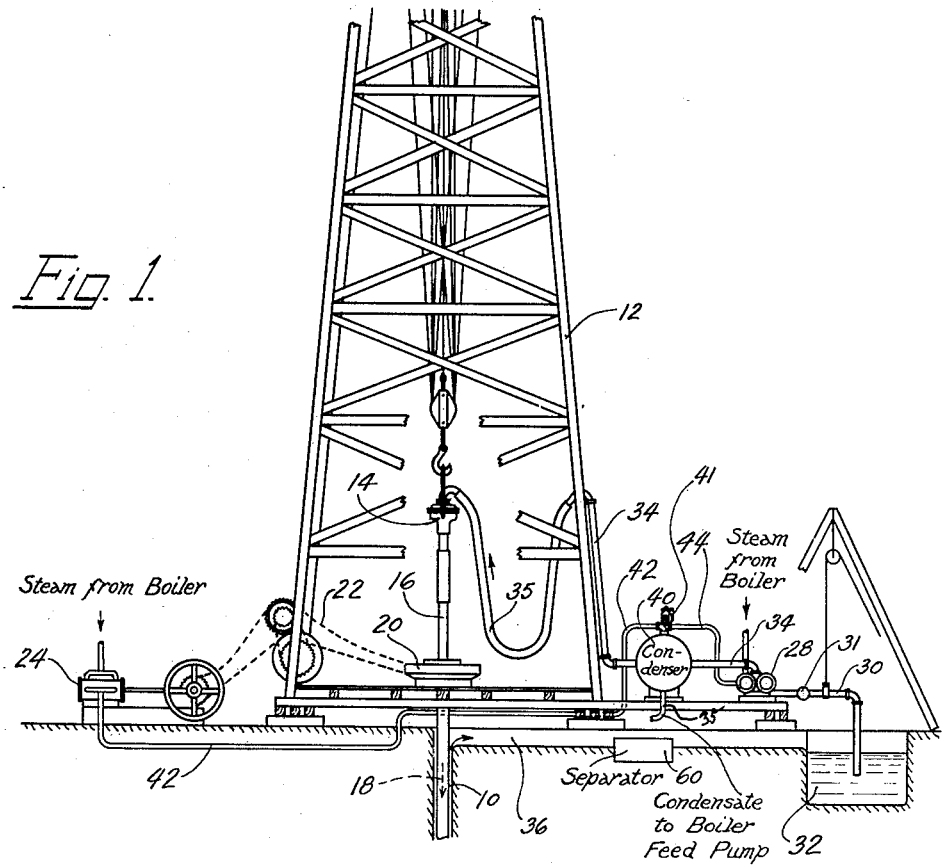

Referring to the drawings more in detail, I have illustrated therein an ordinary rotary well drilling apparatus installed in a position above the well hole 10 on which the apparatus is operating. The drilling apparatus is shown as including a derrick 12 from which is suspended, by means of ordinary block and tackle, the usual hydraulic feed having the swivel head 14 from which the shaft 16 is suspended and through which mud or slush is passed into the hollow drill shaft 16. Fluid which passes downwardly through the shaft 16, as indicated by arrow 18, returns to the surface of the ground again between the outer face of shaft 16 and the inner face of the well hole 10. As illustrated, the means for rotating the shaft 16 comprises a rotary head 20 having the ordinary means for gripping shaft 16 and which is operated by a chain drive 22 from the steam engine 24 which takes steam from boiler 26, indicated in Fig. 2. For pumping mud into the head 14 and the shaft 16 a steam operated pump 28 is provided which is connected by a suction line 30 with a slush pit 32 in which mud is stored. Mud from pump 28 is conducted to the head 14 by a line 34 having a flexible portion 35 permitting the head 14 to be raised and lowered. The mud which has passed down shaft 16 then flows upwardly and out of the mouth of well hole 10 whence it is conducted into the slush pit 32 through a conduit 36 so that it may be returned to the well through the shaft 16, as above described. While I have shown condenser 40 in the pressure line 34 between the outlet of the mud pump and the drill shaft, I do not limit myself to any particular location of the condenser in the circuit for the mud.

Figure 2:
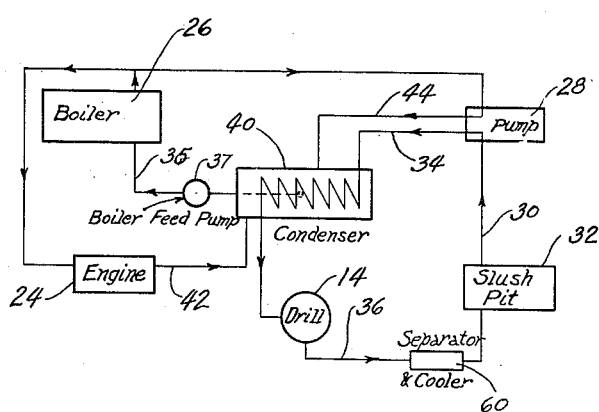
Fig. 2 is a diagrammatic view of the apparatus illustrated in Fig. 1.

In order to preheat the mud in accordance with my invention before it is introduced into the well, I have illustrated a condenser 40 connected into the mud discharge line 34 of pump 28. Steam exhausted from engine 24 and pump 28 is conducted into the shell of condenser 40 by means of pipes 42 and 44 respectively, whereas the mud from pump 28 is conducted by pipe 34 to an inlet chamber 46 within the condenser 40 from which point the mud flows through a series of tubes 48 within the condenser to the outlet chamber 50 from which it is taken up again by pipe 34 and conducted to the head 14. The relatively cool fluid in tubes 48, therfore, condenses the steam entering condenser 40 from the prime movers 24 and 28 and the condensate thus formed may be used for feed water for boiler 26 in accordance with the usual practice in condensing steam plants. A condensate line 35, containing feed pump 37 is indicated in Fig. 2 for delivery condensate from condenser 40 to boiler 26. Very little make-up water is therefore required for the boiler 26 and it is commercially feasible to use distilled make-up water or make-up water shipped to the oil field from a pure natural source.

It has been objected to the use of mud as a condensing medium, that it would cake on the surfaces of the condenser tubes and prevent any material transfer of heat from the steam to the mud. However, it has been found by test that it is necessary only to maintain a 10 lb. pressure differential between chamber 46 and chamber 50 of condenser 40 in order that the flow through tubes 48 be sufficiently rapid to keep the surfaces clean and cause the efficient heat transfer above described. Preferably condenser 40 has a safety valve 41 thereon so that exhaust steam may pass out of it to the atmosphere in case the flow of cooling mud is interrupted.

Of course, if the drill shaft 16 were operated by a Diesel or other combustion type engine, the heater for the mud would not be of the condenser type.

When drilling in certain formations it is desirable to separate out from the mud some of the chips or other material brought up from the well before the mud is run into the slush pit 32. In certain fields, moreover, the deeper strata have a sufficiently high temperature so that the mud is not an efficient condensing agent. When these two conditions occur simultaneously, a separator 60 of the type illustrated in detail in Fig. 5 may be used, and which is adapted not only to separate out some of the solid material from the mud but also to cool it somewhat before going to the slush pit. The separator 60 is indicated diagrammatically in Figs. 1 and 3 in the mud line 36 between the well hole 10 and the slush pit 32, and is shown more in detail in Fig. 5. Separator 60 comprises, as shown, a central relatively elevated semi-cylindrical conduit 62 connected by means not shown to receive the stream of mud flowing from the mouth of the well hole 10. The mud stream overflows the lateral edges of conduit 62 onto inclined screens 63 adapted to separate out the coarse pieces being transported by the mud and to keep such pieces in the outer segments 64, 64 of the box 66 of the separator. The central segment 68 of box 66 is connected to slush pit 32 through aperture 70, while the separated material can be readily removed from segments 64 of separator 60. In the course of overflowing the edges of conduit 62 and flowing through screens 63, the mud is cooled as well as relieved of large cuttings.

It will be understood that the apparatus for pumping mud ordinarily employs a suction line 30 which is hinged, as indicated at 31, so that the level from which the mud is derived may be adjusted somewhat to predetermine the viscosity and percentage of solid matter going to the well. When using a heater or condenser in line 34 the lower end of the suction line 30 may be maintained at a somewhat lower level than is now the common practice, for reasons stated above.

What I claim is:

1. The combination with a rotary drill shaft of a steam pump connected therewith in such a manner as to permit forcing muddy fluid into said shaft, a condenser through which said muddy fluid passes on its way to said shaft and which is adapted to utilize said fluid as a cooling medium, and connections for leading the exhaust steam from said pump to said condenser.

2. The combination with a rotary drill shaft, of means for operating said shaft comprising a steam engine, a condenser connected to receive exhaust steam from said engine, and means for forcing muddy cooling fluid through said condenser into said shaft.

3. The combination as set forth in claim 1 together with and in which the means for forcing the muddy fluid through the condenser includes a steam operated pump, together with connections for leading the exhaust steam from said pump to the condenser.

4. The method of operating a steam driven rotary drill rig having a boiler and means for circulating muddy fluid into and out of the drill hole comprising condensing the steam exhausted from the steam using means of the rig by heat interchange through heat conducting metal with said muddy fluid and returning the condensate so formed to the boiler of the rig.

5. The combination with a well hole of a slush pit, a condenser, means including a steam pump for circulating slush from said pit through said hole and condenser, and a connection for leading steam exhausted from said pump into said condenser.

6. The combination according to claim 5 together with a boiler and means for forcing condensate from the condenser into said boiler.

7. The combiation with a rotary steam drill rig having a boiler, an engine and means for circulating muddy fluid into and out of the drill hole, of a surface condenser connected to receive steam to be condensed from the engine of the rig, means whereby said fluid is utilized to cool the condensing surface of said condenser, and means for delivering condensate from said surface condenser to said boiler.

8. The combination as set forth in claim 7 and in which the means for circulating the mud includes a slush pit, and means intermediate the well hole and said slush pit for simultaneously separating out some of the solids from the fluid and for cooling it.

FREDERIC I. EPLEY.